3,225,005
PROCESS FOR THE MANUFACTURE OF HEAT-STABILIZED COPOLYMERS OF POLYOXY-METHYLENES
Klaus-Dieter Asmus and Edgar Fischer, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 18, 1962, Ser. No. 195,958
Claims priority, application Germany, May 19, 1961, F 33,957; Mar. 22, 1962, F 36,346
12 Claims. (Cl. 260—67)

The present invention relates to a process for the manufacture of heat-stabilized copolymers.

Several ways are known for completely decomposing polyoxymethylene containing terminal OH groups. Decomposition can already be produced by heating the polymer, for example, in the case of paraformaldehyde. Furthermore, polyoxymethylene can be depolymerized in a non-aqueous solution or aqueous suspension at elevated temperatures in the presence of basic catalysts.

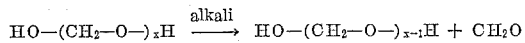

It is also known to separate mixtures of etherified and unetherified polyoxymethylene by completely decomposing the unetherified portions according to one of the above mentioned methods.

It is furthermore known to decompose copolymers containing polyoxymethylene groups in the chain from the chain ends until a comonomer unit of the chain is reached. In addition to the above mentioned methods, it has also been proposed to treat the polymer with aqueous solutions of alkali metal hydroxides, alkali metal carbonates, alkaline earth metal oxides or hydroxides, or ammonium hydroxide at elevated temperatures under atmospheric or superatmospheric pressure. These processes, however, have the disadvantage that the quality and the color of the copolymer are impaired by known but uncontrollable reactions of the proposed inorganic compounds with the formaldehyde which has been split off, for example by saccharification (alkaline earth metal oxides and hydroxides) or a Cannizzaro reaction (alkali metal hydroxides). In the case of copolymers containing polyoxymethylene groups in the chain, the terminal polyoxymethylene groups must be removed as completely as possible to obtain products of good thermostability.

Now we have found that copolymers containing polyoxymethylene groups and possessing terminal oxymethylene groups can be decomposed in an especially advantageous manner by subjecting an aqueous suspension of a formaldehyde copolymer or a trioxane copolymer—the said suspension containing 99 to 50 parts by weight of water and 1 to 50 parts by weight of the copolymer, advantageously 80 to 70 parts by weight of water and 20 to 30 parts by weight of the copolymer—at a pH value of at least 8 in admixture with at least one compound reactive with formaldehyde and, if desired, in the presence of an organic swelling agent for the copolymer, to a thermal treatment at 100 to 150° C., advantageously 140 to 148° C. Compounds suitable for use in the process of the invention are, for example, salts of a strong base with a weak acid which salts in the form of a 0.1% aqueous solution have a pH value of at least 8 and of which the anion or the cation reacts with formaldehyde. Exemplary of such salts are guanidine carbonate, ammonium carbaminate, ammonium carbonate, alkali metal sulfites such as sodium sulfite or potassium sulfite, alkali metal bisulfites such as sodium bisulfite or potassium bisulfite, alkali metal cyanates or alkaline earth metal cyanates such as the cyanate of sodium, potassium, calcium, strontium or brium, alkali metal cyanides or alkaline earth metal cyanides such as the cyanide of sodium, potassium or calcium. The aforesaid compounds are generally used in an amount of 0.1 to 10%, advantageously 0.5 to 2%, calculated on the weight of the suspension medium.

In many cases, the decomposition of the copolymer is advantageously carried out in the presence of a mixture consisting of an inorganic compound having an alkaline reaction and an organic or inorganic compound reactive with formaldehyde. As examples of suitable inorganic compounds having an alkaline reaction there may be mentioned ammonium hydroxide, alkali metal hydroxides, e.g. sodium hydroxide or potassium hydroxide, alkali metal carbonates, e.g. sodium carbonate or potassium carbonate, alkali metal bicarbonates, e.g. sodium bicarbonate or potassium bicarbonate, alkaline earth metal oxides and hydroxides, e.g. magnesium oxide, calcium oxide, strontium oxide, barium oxide, magnesium hydroxide, calcium hydroxide, strontium hydroxide or barium hydroxide and trisodium phosphate. As compounds reactive with formaldehyde which serve to intercept the formaldehyde and thereby shift the equilibrium in the desired direction there may be mentioned, for example, mono- or polyvalent amines which carry at least one proton at the nitrogen atom, e.g. ethanolamine, diethanolamine, morpholine, ethylene diamine, diethylene triamine, polyethylene imines, hydrazine. As compounds intercepting formaldehyde there may also be used cyanamide, dicyandiamide, amides of monobasic saturated carboxylic acids with 1 to 18 carbon atoms, e.g. formamide, amides of dibasic saturated carboxylic acids with 2 to 10 carbons atoms. Especially suitable for intercepting formaldehyde are substituted and unsubstituted amides of carbonic acid or thiocarbonic acid, for example urea or thiourea, partially or completely alkylated ureas or thioureas, for example monomethyl urea or ethylene urea, and finally hydrazides of urea or thiourea.

The inorganic compound having an alkaline reaction is generally used in an amount of 0.1 to 10%, advantageously 0.5 to 2%, calculated on the weight of the suspension medium. The compound serving to intercept the formaldehyde is added in an amount of 0.5 to 50 mol percent, calculated on the oxymethylene groups contained in the copolymer.

In an especially advantageous form of the process of the invention, the decomposition of the copolymer is carried out in the presence of ammonium hydroxide and at least one of the above mentioned compounds intercepting formaldehyde. The amount of ammonium hydroxide used is within the range of 0.1 to 5%, advantageously 0.5 to 2%, calculated on the weight of the suspension medium.

It is advantageous, in any case, to add as compounds intercepting formaldehyde those compounds which form water-soluble condensation compounds under the reaction conditions given and which, like their condensation compounds, can readily be removed from the decomposed copolymer by a simple washing process.

In principle, phenols may also be used as compounds intercepting formaldehyde. They have, however, the disadvantage of yielding condensation products which are only unsatisfactorily soluble in water, give rise to a discoloration of the copolymer and can be removed from the latter only by washing with organic solvents.

If it is intended that the formaldehyde which has been split off be obtained in such a form that it is easy to regenerate, such an addition component is used as enables a resplitting to be carried out in a simple manner, for example, by shifting the pH value to the acid range. Examples of substances which react with formaldehyde and from which formaldehyde can be split off by shifting the pH value to the acid range, are alkali metal sulfites.

As copolymers to be decomposed in accordance with the invention there may be mentioned, for example, copolymers of formaldehyde or of trioxane with a cyclic ether or a cyclic acetal with at least 2 neighboring carbon atoms, e.g. ethylene oxide, the formal of ethylene glycol or the formal of diethylene glycol. The process of the invention can be used with special advantage for the decomposition of unstable terminal oxymethylene groups of copolymers which consist to an extent of at least 80% by weight of oxymethylene units which are not terminal.

In principle, the unstable terminal groups of copolymers containing terminal oxymethylene groups can already be decomposed by boiling such copolymers under atmospheric pressure. It is, however, advisable and advantageous in order to obtain favorable reaction times to work under pressure, for example a pressure of up to 6 atmospheres gage, preferably 1 to 6 atmospheres gage, at temperatures between 100 and 150° C. The upper limit of temperature for carrying out the reaction in a favorable manner is given by the melting or sintering point of the polymer. At temperatures above the said point, pronounced formation of lumps occurs and longer reaction times are required in spite of increased temperatures.

The necessary reaction time depends considerably on the nature and the amount of the alkalies, on the nature and the amount of the addition component and to a very large extent on the reaction temperature. Under favorable conditions, reaction times ranging from 20 minutes to 2 hours are required.

As has been found, the reaction can be further facilitated by adding a swelling agent for the polymer. For this purpose, amides such as dimethyl formamide, especially pyrrolidone, may for example be used. Monohydric saturated aliphatic alcohols, e.g. methanol or ethanol, also have a favorable action. Especially suitable swelling agents are polyhydric saturated aliphatic alcohols and the ethers thereof, for example glycerol or alkylene glycols and/or polyalkylene glycols or the ethers thereof. Examples of suitable glycols or glycol ethers are ethylene glycol, propanediol-1.2, propanediol-1.3, diethylene glycol, triethylene glycol, diethylene glycol monomethyl ether, diethylene glycol dimethyl ether, diethylene glycol monoethyl ether, diethylene glycol monobutyl ether.

The compounds mentioned above as swelling agents are well soluble in water and possess a good swelling action for the copolymer under the reaction conditions.

In general, the quantity of one or more swelling agents added to the reaction mixture amounts to 2 to 50%, advantageously 5 to 10%, calculated on the weight of the suspension medium.

When the decomposition is finished, the swelling agents can be readily removed from the cold suction-filtered copolymer by washing with water. The copolymers which have been decomposed in the presence of a swelling agent are white and possess a good thermostability.

The following examples serve to illustrate the invention but they are not intended to limit it thereto.

In the examples, there were used copolymers of 97 parts by weight of trioxane and 3 parts by weight of diethylene glycol formal which had been obtained by the process described in U.S. patent application S.N. 33,087 filed June 1, 1960, and copolymers of 98 parts by weight of trioxane and 2 parts by weight of ethylene oxide.

EXAMPLE 1

In an autoclave, 50 grams of a copolymer of 97 parts by weight of trioxane and 3 parts by weight of diethylene glycol formal were heated for 60 minutes at 140 to 150° C. with 500 cc. of an aqueous solution containing 1% by weight of ammonium hydroxide, 1% by weight of urea and 10% by weight of methanol. After cooling, the product was suction-filtered, washed several times with distilled water and dried for several hours at 70° C. in a vacuum drier. The product was white. The following Table I indicates the losses in weight (in percent) at 220° C. within 30 minutes of the treated and the untreated copolymer.

*Table I*

| | Loss in weight in percent |
|---|---|
| Untreated | 10.5; 9.5 |
| Treated | 6.4; 7.0 |

EXAMPLE 2

In an autoclave, 50 grams of a copolymer of 97 parts by weight of trioxane and 3 parts by weight of diethylene glycol formal were heated for 60 minutes at 140 to 150° C. with 500 cc. of an aqueous solution containing 10% by weight of sodium sulfite and 10% by weight of dimethyl formamide. The product was suction-filtered, washed with distilled water and dried. The product was white. The following Table II indicates the thermostability of the copolymer determined in the manner described in Example 1.

*Table II*

| | Loss in weight in percent |
|---|---|
| Untreated | 14.1; 14.1 |
| Treated | 6.8; 6.6 |

EXAMPLE 3

In an autoclave, 50 grams of a copolymer of 97 parts by weight of trioxane and 3 parts by weight of diethylene glycol formal were heated for 60 minutes at 140 to 150° C. with an aqueous solution containing 2% by weight of ethanol amine, 1% by weight of trisodium phosphate and 10% by weight of methanol. The product was suction-filtered, washed and dried. The product was white. The following Table III indicates, the thermostability of the copolymer determined in the manner described in Example 1.

*Table III*

| | Loss in weight in percent |
|---|---|
| Untreated | 10.5; 9.5 |
| Treated | 4.7; 4.9 |

EXAMPLE 4

In an autoclave, 120 grams of a copolymer of 97 parts by weight of trioxane and 3 parts by weight of diethylene glycol formal were heated at 140° C. for 15 minutes with 600 cc. of an aqueous solution containing 1% by weight of ammonia, 2.5% by weight of n-propanol and 0.5% by weight of hydrazine. The product was suction-filtered, washed with water and dried. The following Table IV indicates the thermostability of the product determined in the manner described in Example 1.

*Table IV*

| | Loss in weight in percent |
|---|---|
| Untreated | 8.7; 9.2 |
| Treated | 2.9; 2.7 |

EXAMPLE 5

A. In a 2 liter autoclave, 240 grams of a copolymer of 97 parts by weight of trioxane and 3 parts by weight of diethylene glycol formal were heated at 140° C. for 15 minutes with 1200 cc. of an aqueous solution containing 9.6 cc. of concentrated ammonia, 120 cc. of methanol and 12 grams of urea. The reaction solution remained colorless. A pure white product of good thermostability was obtained.

B. The above test was repeated without the addition of urea. Although the other reaction conditions were the same, the solution turned a deep brown and the polymer also underwent a brownish discoloration and could not be converted into a white product by washing. The thermostability of the product was inferior to that of the product treated as described above, sub item A.

The following Table V indicates the losses in weight (in percent) of an untreated test sample and of test samples which had been treated as described above, sub A and B, respectively. The test samples had been stabilized with 0.7% by weight of 2.2-methylene-bis-4-methyl-6-tert. butyl phenol and 0.2% by weight of dicyan diamide.

The losses in weight were determined on test samples which were kept at 230° C. for 45 minutes under air.

*Table V*

| | Loss in weight in percent |
|---|---|
| Untreated product | 4.70 |
| Product treated as described sub A (with the addition of urea) | 1.24 |
| Product treated as described sub B (without the addition of urea) | 1.36 |

EXAMPLE 6

In a glass autoclave, 120 grams of a polymer of 98 parts by weight of trioxane and 2 parts by weight of ethylene oxide were suspended in a solution containing 24 cc. of concentrated ammonia (25% strength, 546 cc. of water, 5 grams of urea and containing furthermore in each case one of the following glycol ethers:

(a) 30 cc. of ethylene glycol monomethyl ether
(b) 30 cc. of ethylene glycol monoethyl ether
(c) 30 cc. of ethylene glycol monobutyl ether, and heated at 140° C. for 15 minutes, while stirring vigorously. After cooling, the products were suction-filtered, washed with water and dried.

The following Table VI indicates the losses in weight determined on test samples which were kept at 230° C. for 45 minutes and which had additionally been stabilized with 0.7% by weight of 2.2-methylene-bis-4-methyl-6-tert. butyl phenol and 0.2% by weight of dicyan diamide.

*Table VI*

| Ethylene glycol ether: | Loss in weight in percent |
|---|---|
| (a) Ethylene glycol monomethyl ether | 0.92 |
| (b) Ethylene glycol monoethyl ether | 0.95 |
| (c) Ethylene glycol monobutyl ether | 1.04 |

EXAMPLE 7

In a glass autoclave, 120 grams of a copolymer of 98 parts by weight of trioxane and 2 parts by weight of ethylene oxide were heated, while stirring, at 140° C. for 15 minutes in a solution containing 24 cc. of concentrated ammonia, 546 cc. of water, 5 grams of urea and containing furthermore in each case one of the following swelling agents:

(a) 30 cc. of ethylene glycol
(b) 30 cc. of diethylene glycol
(c) 30 cc. of diethylene glycol monoethyl ether
(d) 30 cc. of diethylene glycol dimethyl ether.

After cooling, the products were suction-filtered, washed with water and dried.

Table VII indicates the losses in weight determined on test samples which were kept at 230° C. for 45 minutes and which had additionally been stabilized with 0.7% by weight of 2.2-methylene-bis-4-methyl-6-tert. butyl phenol and 0.2% by weight of dicyan diamide.

*Table VII*

| Swelling agent: | Loss in weight in percent |
|---|---|
| Ethylene glycol | 0.85 |
| Diethylene glycol | 1.03 |
| Diethylene glycol monoethyl ether | 1.13 |
| Diethylene glycol dimethyl ether | 0.96 |

We claim:

1. A process for the manufacture of a heat-stabilized copolymer which comprises heating, to a temperature of 100 to 150° C. and at a pH of at least 8, an aqueous suspension of 1 to 50 parts by weight of a copolymer of (A) a member selected from the group consisting of formaldehyde and trioxane with (B) a member selected from the group consisting of ethylene oxide, ethylene glycol formal and diethylene glycol formal, said copolymer initially having terminal oxymethylene groups, in 99 to 50 parts by weight water and in admixture with 0.1 to 10% by weight of a formaldehyde-intercepting compound reactive with formaldehyde under the reaction conditions.

2. A process as claimed in claim 1 wherein the copolymer used is a copolymer consisting to the extent of at least 80% of non-terminal oxymethylene units.

3. A process for the manufacture of a heat-stabilized copolymer which comprises heating, to a temperature of 100 to 150° C. and at a pH of at least 8, an aqueous suspension of 1 to 50 parts by weight of a copolymer of (A) a member selected from the group consisting of formaldehyde and trioxane with (B) a member selected from the group consisting of ethylene oxide, ethylene glycol formal and diethylene glycol formal, said copolymer initially having terminal oxymethylene groups, in 99 to 50 parts by weight water and in admixture with 0.1 to 10% by weight of a formaldehyde-intercepting compound selected from the group consisting of guanidine carbonate, ammonium carbonate, ammonium carbaminate, alkali metal sulfites, bisulfites, cyanates and cyanides, alkaline earth metal cyanates and cyanides, mono- and polyvalent amines, polyethylene imines, hydrazine cyanamide, dicyandiamide, amides of monobasic saturated carboxylic acids having 1 to 18 carbon atoms, amides of dibasic saturated carboxylic acids having 2 to 10 carbon atoms, urea, thiourea, monoalkyl and dialkyl ureas and thioureas, and hydrazides of urea and thiourea.

4. A process as defined in claim 3 wherein the formaldehyde-intercepting compound is urea.

5. A process as defined in claim 3 wherein the formaldehyde-intercepting compound is sodium sulfite.

6. A process as defined in claim 3 wherein the heating is carried out for from about 20 minutes to about 2 hours.

7. A process as defined in claim 3 wherein the temperature of heat treatment is 140 to 148° C.

8. A process as defined in claim 3 wherein the aqueous suspension is of 20 to 30 parts by weight of copolymer in 80 to 70 parts by weight water.

9. A process as defined in claim 3 wherein said suspension is heated in the presence of from 2 to 50% by weight, calculated on the weight of suspension medium, of an organic swelling agent for the copolymer.

10. A process as defined in claim 9 wherein the organic swelling agent is a member selected from the group consisting of dimethyl formamide, pyrrolidone, monohydric saturated aliphatic alcohols and polyhydric saturated aliphatic alcohols and ethers thereof.

11. A process as defined in claim 9 wherein the organic swelling agent is present in an amount of from 5 to 10% by weight.

12. A process as claimed in claim 9 wherein the swelling agent is a monohydric alcohol.

References Cited by the Examiner

UNITED STATES PATENTS

| 2,350,350 | 6/1944 | Gresham | 260—67 |
| 2,989,509 | 6/1961 | Hudgin et al. | 260—67 |
| 3,027,352 | 3/1962 | Walling et al. | 260—67 |
| 3,046,249 | 7/1962 | Hermann et al. | 260—45.9 |
| 3,072,609 | 1/1963 | Berardinelli et al. | 260—67 |
| 3,097,913 | 4/1963 | Kray et al. | 260—45.95 |

WILLIAM H. SHORT, *Primary Examiner.*

J. R. LIBERMAN, *Examiner.*